July 22, 1969   G. B. JORDAN ET AL   3,457,424

PERFORATED RECORD SYSTEM USING LIGHT TRANSMITTING BLOCK

Filed July 15, 1965 2 Sheets-Sheet 1

INVENTORS
BRUCE E. BACHMAN
GARY B. JORDAN

INVENTORS
BRUCE E. BACHMAN
GARY B. JORDAN

United States Patent Office 3,457,424
Patented July 22, 1969

3,457,424
PERFORATED RECORD SYSTEM USING LIGHT TRANSMITTING BLOCK
Gary B. Jordan, 21018 Stagg Ave., Canoga Park, Calif. 91304, and Bruce E. Bachman, 6406 Everall Ave., Baltitmore, Md. 21206
Filed July 15, 1965, Ser. No. 504,279
Int. Cl. H01j 5/16; G02b 5/14
U.S. Cl. 250—227                                      5 Claims

ABSTRACT OF THE DISCLOSURE

An improved light source for use in an optical data translating system, which source includes a block of light transmitting material having first hole means formed on one face thereof with a light source being mounted within said first said hole means. Second hole means are formed in another face of said block, said holes being formed in a predetermined pattern and having walls provided with a matte or frosted finish. Light is emitted into the block by the light source and is gathered by the second hole means and emitted as substantially collimated beams.

---

This invention relates to optical signaling apparatus, and more particularly to an improved light energy distribution means for optical data translators.

In the art relating to data storage and retrieval, data is frequently recorded, in coded form, on paper cards or tape, with holes or perforations in the card or tape representing the encoded data. A variety of means has heretofore been provided for detecting these holes or perforations in order to effect a retrieval of the stored data. These means have included such mechanical arrangements as electrical brushes which make contact through the holes in the card or tape to a contact platen on the opposite side. Again, these means have included optical means for detecting these holes. This latter class of detectors has included such means as individual lamps for each hole position to be sensed, so-called fiber-optics means for piping light from a source to the individual hole positions, or lens means for directing light from a source to an opaque screen having windows or perforations at the desired hole sensing positions. While these means have found wide use, heretofore, they have not been entirely satisfactory for one reason or another. For example, the mechanical sensing devices are either too slow in operation or are not reliable in that they are subject to mechanical wear. The previous optical devices are either excessively bulky, expensive, inefficient, or provide a measure of unreliability in that the failure of a single light source may disrupt the operation of the entire system.

It is, accordingly, an object of the present invention to provide an improved recorded data retrieval means.

It is another object of the present invention to provide an improved optical sensing means for detecting data recorded as perforations in a record member.

It is a further object of this invention to provide, in an optical data scanner, an improved light energy distribution means.

It is still another object of this invention to provide an improved light energy distributing means, as set forth, which is compact in size, highly efficient and provides a high degree of uniformity of distributed light and is reliable.

In accomplishing these and other objects, there has been provided, in accordance with the present invention, an optical data detector which includes a multiple light source and means for efficiently distributing the light from such source to a plurality of reading stations or positions. The distributing means includes means to substantially collimate the light emitted as the reading stations or positions, and further includes means whereby the failure of one of the light source members, or lamp, will not cause a failure of the system.

Figure 1:
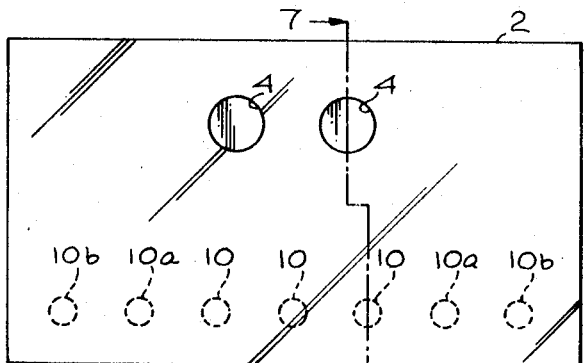
Figure 2:
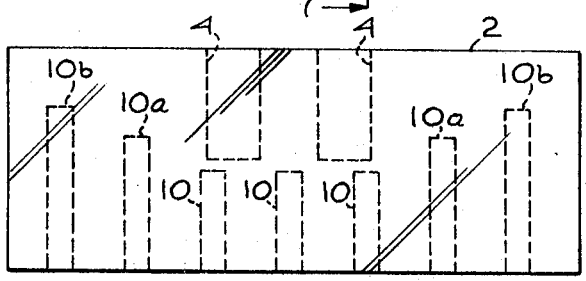
Figure 3:
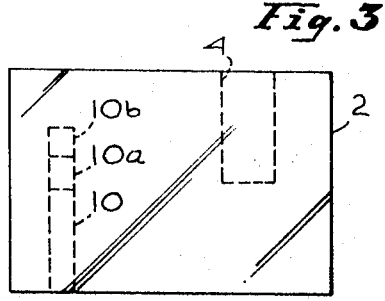
Figure 4:
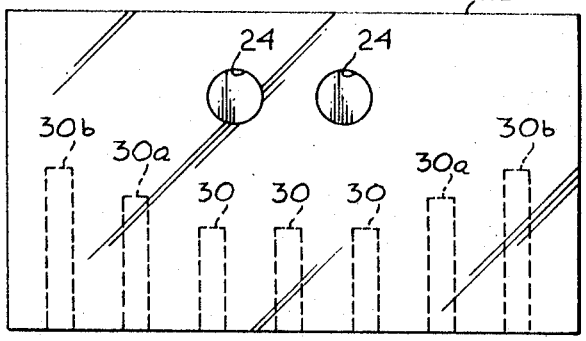
Figure 5:
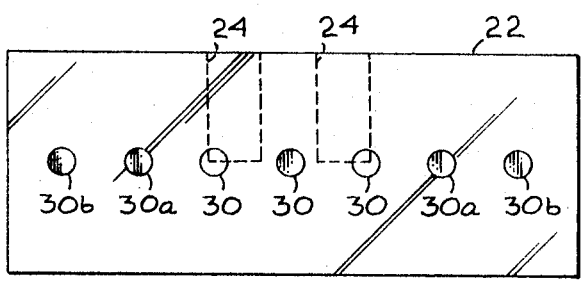
Figure 6:
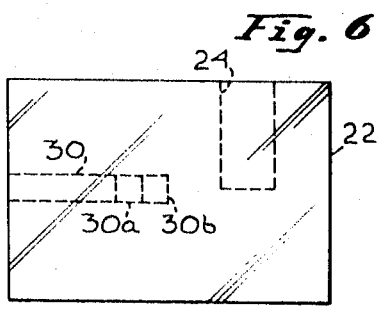
Figure 8:
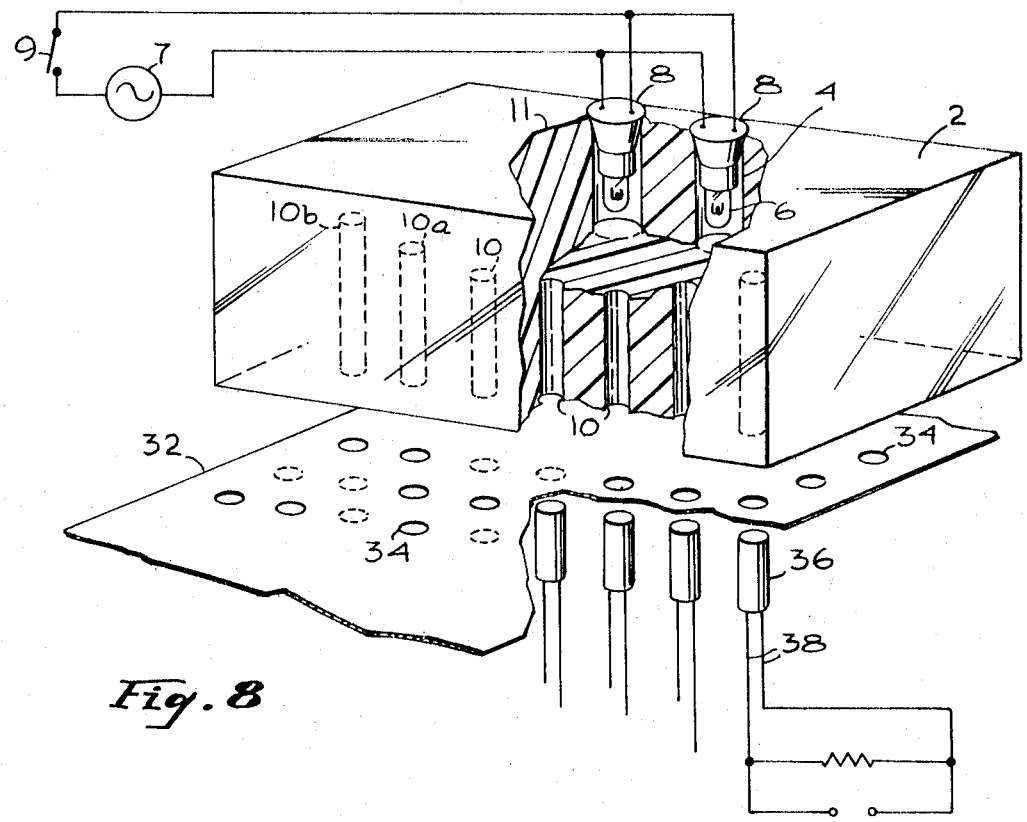
Figure 7:
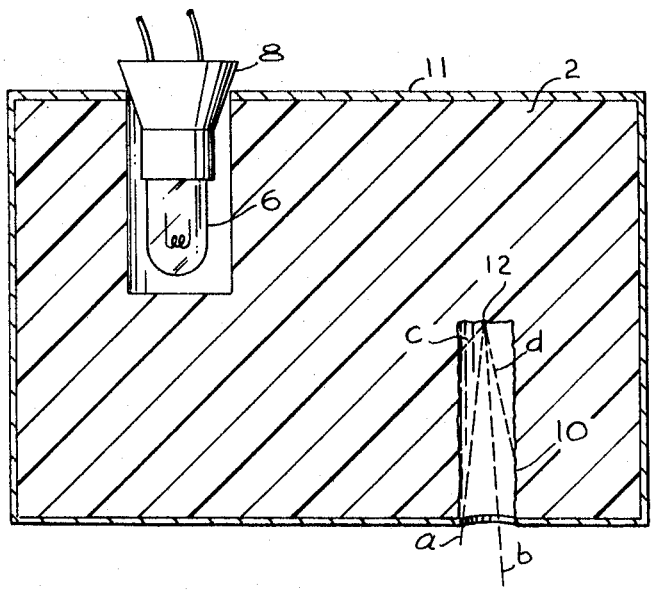

A better understanding of this invention may be had from the following detailed description when read in connection with the accompanying drawings, in which:

FIG. 1 is a top view of a light distribution member constructed in accordance with the present invention, FIG. 2 is a side view of the structure shown in FIG. 1, FIG. 3 is an end view of the structure shown in FIG. 1, FIG. 4 is a top view of a somewhat different structure also embodying the present invention, FIG. 5 is a side view of the structure shown in FIG. 4, FIG. 6 is an end view of the structure shown in FIG. 4, FIG. 7 is a cross-sectional view taken along the line 7—7 of FIG. 1 and viewed in the direction of the appended arrows, and FIG. 8 is a perspective view, partly broken away, illustrating the application of the light distributing member to a data translator in accordance with the present invention.

Referring, now, to the drawings in more detail, there is shown, in FIGS. 1 to 3, one form of structure which embodies principles of the present invention. In order to provide means for uniformly distributing light energy from a source means to each of a plurality of sensing positions or stations, there has been provided a block 2 of clear light transmitting material such as a suitable plastic. Holes 4 are formed in one face of the block 2 to provide means for introducing therein light energy from light source means such as a pair of lamps 6, shown in FIGS. 7 and 8. In order to provide a high degree of reliability, more than one lamp, hence, more than one hole is required. To this end, two holes are shown. If a higher order of reliability is required at the price of additional light sources, it is apparent that as many or as few lamps and corresponding holes may be employed as is necessary under any particular condition. However, two such holes and lamps are illustrative and in most cases will be adequate. These holes are preferably formed to a depth of one-half the thickness of the block and are made deep enough to receive the lamp 6 and enough of the lamp mounting means 8 to securely hold the lamp in place within the hole 4. Stated conversely, the thickness dimension of the block 2 is twice the depth of the hole 4 required to accommodate the light source means.

In any face of the block 2 other than the face into which the holes 4 are formed, a plurality of light energy emitting holes 10 is formed. In FIGS. 1 to 3, 7 and 8, these holes are shown formed into the face opposite from the face into which the holes 4 are formed. The walls of the emitting holes 10 are provided with a matte, or frosted, finish to enhance the emission characteristics thereof as will be explained in more detail hereinafter. The emitting holes 10 are positioned in whatever array may be necessary to effect a translation of the recorded data. This will, of course, depend upon the format of the data record including the mode of retrieving that data. If the data is recorded as a rectangular array of perforations on a card, and it is desired to read the whole card at once, than an emitting hole 10 must appear at each possible perforation position. On the other hand, if the card is to be read one line at a time, then a single row of holes 10 may be used, corresponding in number and position to the number and location of the perforation on each line of the card. Similarly, when the data is stored as perforations in a tape, the holes 10 must correspond in number and position to a line of perforations on the tape. This latter configuration is chosen as being illustrative for this case, and is the format shown in the drawings.

In order to assure a measure of uniformity in the light energy emitted by the holes 10, the holes 10 nearest to the source holes 4, are made of minimum depth, which is substantially one-half the thickness of the block 2. The holes 10a and 10b which are more remote from the source means are made progressively deeper, as shown in FIG. 2, to increase their light gathering capacity, as will be discussed more fully hereinafter.

In FIGS. 4, 5 and 6, there is shown a block 22 of light transmitting material similar to that shown in FIGS. 1, 2 and 3. As in the case of the block 2, the block 22 is provided with a pair of holes 24 into which light source means may be mounted. Again, as before, the block 22 is also provided with a set of light energy emitting holes 30. Here, too, the emitting holes 30 which are nearest to the light source means are of minimum depth while those more remote, such as holes 30a and 30b, are progressively deeper. The block 22 differs from block 2 only in the relative location of the emitting holes. Whereas in the case of the block 2, the emitting holes 10 were formed into the face of the block opposite from light source holes 4; in the block 22, the emitting holes 30 are formed in a face of the block adjacent to the face into which the source holes 24 are formed. Thus, in the block 22, the emitting holes 30 extend in a direction perpendicular to the direction of the light source holes 24.

In FIG. 7 there is shown an enlarged cross-sectional view, illustrating a cross section of the structure shown in FIGS. 1 to 3. In addition to the features already discussed, the block 2 is provided with an opaque coating 11 which is characterized by reflecting light, that which would tend to emerge from the block, back into the block for redistribution to the admitting holes.

In prior art devices which have used clear plastic blocks as light distribution means, these have been in the form of plain blocks of polished plastic with one surface or elemental areas of the surface roughened or frosted to provide apparent local radiating sources. Light introduced into the block, as by the lamps 6, radiate within the block and, when a light ray impinges on one of the polished surfaces, will be either internally reflected or will escape from the block, depending upon whether the individual light ray encounters that polished surface at an angle which is less than or greater than the critical angle, as determined by well known optical principles. The roughened matte, or frosted, areas provide a number of very small surface elements which are at various angles with respect to the general plane of the surface. This arrangement provides means whereby a greater portion of the light incident on that surface is emitted. Basically, this type of light distributor is highly efficient, if the ratio of the radiating area to the total area is high. However, as that ratio decreases, the efficiency decreases accordingly. When the radiating or emitting portions are reduced to several elemental areas on one surface of the block, the efficiency is quite low.

Further, when the emitting portions are elemental areas on the surface of the block, the emitted light radiates in all directions within a 180° solid angle. Only a portion of that emitted light would be useful in translating the data recorded as perforations in a record member.

The structure according to the present invention provides a substantial improvement over these previous devices in that for the same apparent emitting area, the efficiency of the device is considerably enhanced. There are several factors contributing to this improved efficiency. First, by drilling holes into the block at each of the positions where an emission of light is desired, and making sure that the walls and bottoms of these holes thus formed are provided with a matte or frosted surface, the effective light gathering and emitting area is substantially increased by an amount which is a function of the area of the cylindrical wall of the individual holes.

A second feature which contributes to the improved efficiency is the collimating effect of the emitting holes. As previously noted, each point in the frosted surface appears as a source of light energy, the emitted light from which radiates in all directions within the exposed solid angle. When that emitting point is located within a hole, illustrated as the point 12 in FIG. 7, only those light rays emanating from the point 12 which are in a direction to clear the edge of the hole 10 are emitted to perform the desired work. These rays are illustrated as rays a and b in FIG. 7. Other rays c and d which are directed at an angle too wide to clear the opening defined by the edge of the hole 10 strike the roughened surface of the side wall of the hole 10 and are refracted back into the body of the plastic block for further distribution. Thus these wide angle rays, instead of being scattered, and wasted, as in the prior art devices of this general type, are returned for redistribution for subsequent emergence as a useful ray. The same action occurs at each of the emitting holes, thus enhancing the efficiency of the operation of the light energy distribution block.

A third feature, which helps to augment the efficiency of the present light distribution block, is the coating 11 on the outer surface of the block as shown in FIG. 7. That coating may be in the form of a deposited or applied metallic coating, a metallic foil coating or a coating of opaque paint or the like. Without the coating, a portion of the light energy would be lost at the interface between the polished surface of the block and the ambient air, since a portion of the light falling on that surface would be at an angle less than the critical angle and would, therefore, emerge from the block. The opaque coating serves, together with the polished interface, as a reflector to return substantially all of the light energy to the block for distribution to the emission holes. The coating 11 is applied to the light distribution blocks 2 such as to completely envelop the block, the only exceptions being at the holes 4 provided for the reception of the lamps 6 and the emission holes 10. Further, the holes 4 are so dimensioned that lamp mounting means 8 effectively close those holes, substantially preventing the escape of any light at those points. Thus, the only places where light energy can escape from the distribution block is through the openings provided by the holes 10 (holes 30 in the form shown in FIGS. 4, 5 and 6). Thus, with the exception of that light lost through energy absorption within the plastic block 2, itself, substantially all of the light energy developed within the block 2 is eventually emitted through the emitting holes 10. This constitutes a considerable improvement in efficiency over those prior art devices wherein the distribution was not provided with such a reflective coating.

Since the light energy from each lamp 6 is distributed throughout the interior of the block 2, being repeatedly reflected, until the individual rays encounter one of the emitting holes 10, the distribution of the light energy from each of the lamps 6 is relatively uniform throughout the block. Additional lamps will provide a measure of increase in the intensity, or quanta, but will not materially affect the distribution. Since the emission characteristics of the various light source means are known, and the illumination required to activate selected photodetectors is known, the particular light source means for any particular may be determined such that any single light source means produces enough light to assure the actuation of the related detectors. A plurality of light source means may then be employed to supply the light energy within the block. While the plurality of light source means may appear redundant, the excess light energy provides, first, a measure of safety in the quanta of light, thereby providing an operation of the detectors which is substantially more than marginal. Second, the plurality of sources provides means assuring continued operation of the system even if one of the light source means should fail. Whereas, in previous systems, failure of a single light source member would render the entire system inoperative because such failure, even if only a single sensing position were involved, would cause the result to be at best uncertain; in the present system, the failure of one of the lamps would merely cause a uniform diminution in the intensity of the light energy leaving all of the emitting holes sufficiently illuminated to cause actuation of the selected detectors.

The inefficiency of previous systems required, in order to produce enough light energy to activate the selected detectors, a more intense light source means. This, in turn, increases the probability of source failure, thereby rendering the system inoperative. The higher efficiency characteristic of the system according to the present invention permits the use of light source means of much lower intensity, thereby prolonging the life-expectancy of the light source means and, consequently, the reliability of the system.

Another feature which is characteristic of the present invention is that it is compact in size. Although the blocks 2 and 22 have been shown as being relatively large, with the various holes well separated, this showing is primarily for the sake of clarity of illustration. In practice, the block need be only large enough to contain the two sets of holes, the separation between the emitting holes being dictated by the format of the record member to be sensed. This compactness is not available in those prior art systems wherein a separate light source means is used for each sensing position. Nor is the compactness readily available in those systems wherein so-called fiber optics are used to effect the light distribution. Thus, compactness is a feature of the light distribution means produced in accordance with the present invention.

In FIG. 8, there is shown a fragmentary perspective view, partly in phantom, of a data retrieval system embodying the present invention. In this view, there is shown a light energy distribution block 2 which follows the configuration shown in FIGS. 1 to 3. This block 2 is provided with an opaque coating 11 constituting a reflective interface between the polished surface of the block and the coating, as described in more detail in the discussion of FIG. 7. As in FIGS. 1–3, a pair of holes 4 is formed into the block 2 for the reception of the lamps 6 and the lamp mounting means 8. The lamps 6 are shown connected to a suitable energizing current source 7 through a selectively operable switch means 9. Into the face of the block 2 opposite from that into which the holes 4 are formed, there are formed a plurality of light emitting holes 10, formed as hereinbefore described. The emitted holes 10 are shown as being arranged in a straight line, to correspond to the format of a record in the form of a tape 32 with a transverse line of perforations 34 representing a recorded character. Positioned opposite and in alignment with each of the emitting holes 10, there is a detector 36. Each detector 36 may be in the form of a suitable photosensitive device, either photovoltaic or photoconductive, with appropriate output leads 38. Each of the detectors 36 has its output leads 38 connected to a corresponding output circuit 40 which may, in turn, be connected to suitable translating circuitry (not shown).

It will be appreciated that, for best operation, the diameter of the holes 10 should be, as nearly as practicable, identical to the diameter of the holes 34 in the record member 32. If the detectors 36 include a lens means which collects light in a solid angle $\alpha$, the distance D separating the detector from the emitting hole may be determined by the equation $$D = \frac{\frac{1}{2} \text{ diameter of the holes}}{\tan \frac{1}{2}\alpha}$$

On the other hand, if no lens is used in conjunction with the detectors 36, the distance between detectors and the holes 10 should be made as small as possible consistent with the thickness of the record member, which must pass between them.

In operation, the switch means 9 is closed, energizing the lamps 6 from the source 7. The light thus produced by the lamps 6 is distributed within the black 2, illuminating the walls and bottom of the holes 10. This, in turn, produces a substantially collimated beam of light issuing from each of the holes 10 toward the corresponding ones of the photodetectors 36. The record member, here the tape 32, is passed between the block 2 and the detectors 36, interrupting the transmission of light from the holes to the detectors. As the tape is advanced, perforations in the tape representing an encoded character will be aligned with corresponding ones of the emitting holes 10. When so aligned, light energy is emitted from the thus exposed holes 10 and falls on the associated ones of the photodetector 36, producing an electrical signal pattern which corresponds to the perforations in the tape, hence, to the encoded character represented by those perforations. As the tape is advanced from line to line, successive character signals will be developed at the output circuits 40 of the several photodetectors 36.

Thus, it may be seen that there has been provided an improved record data retrieval means which is characterized in an improved light distribution means for an optical translator for perforate data records. The light distribution means according to this invention is compact in structure and features a high degree of efficiency and reliability.

What is claimed is:

1. A system for reading a perforated record member which record member has a plurality of perforation positions arranged in a predetermined format comprising: means for directing a plurality of narrow-angle light beams against a first surface of said record member, there being one of said light beams for each of said perforation positions, said beam-directing means including a block of light transmitting material, means for developing light energy within said block, said light energy developing means including at least one light source, first hole means formed in a first surface of said block, and means for mounting said light source in said hole means, and means for collecting said light energy from said block and for forming the collected light energy into said plurality of narrow-angle light beams, said collecting and forming means including a plurality of second hole means formed in a second surface of said block, there being one of said second hole means for each of said perforation positions, and each of said second hole mean being provided with a matte or frosted finish, said second surface being adjacent and parallel to the first surface of said record member; and photodetector means positioned adjacent to a second surface of said record member for receiving light from said beam directing means which light passes through perforations in said record member.

2. The invention as set forth in claim 1 wherein said plurality of holes of said second hole means is arranged in a straight line whereby to correspond to one line of perforations on said record member.

3. The invention as set forth in claim 1 wherein said plurality of holes of said second hole means is arranged in rectangular array whereby to correspond to a rectangular array of perforations on said record member.

4. The invention as set forth in claim 1 wherein those holes of said second hole means nearest to said first hole means are of minimum depth and those holes which are more remote from said first hole means are of progressively greater depth.

5. The invention as set forth in claim 4 wherein said minimum depth is substantially one-half the thickness of said block and said progressively greater depth has a maximum depth substantially three-fourths of the thickness of said block.

References Cited

UNITED STATES PATENTS

| | | | |
|---|---|---|---|
| 2,506,672 | 5/1950 | Kell et al. | 250—227 X |
| 3,281,618 | 10/1966 | Swedlund | 313—109.5 X |
| 3,283,237 | 11/1966 | Williams et al. | 250—239 X |
| 3,300,646 | 1/1967 | Casebeer | 350—96 X |
| 3,310,681 | 3/1967 | Hargens | 250—227 |
| 3,360,657 | 12/1967 | Shlesinger | 250—227 |

ROBERT SEGAL, Primary Examiner

U.S. Cl. X.R.

250—219; 350—96